*Inventors*
Walter L. Abel
Charles C. Bell
Vernon H. Meyer
By their Attorney

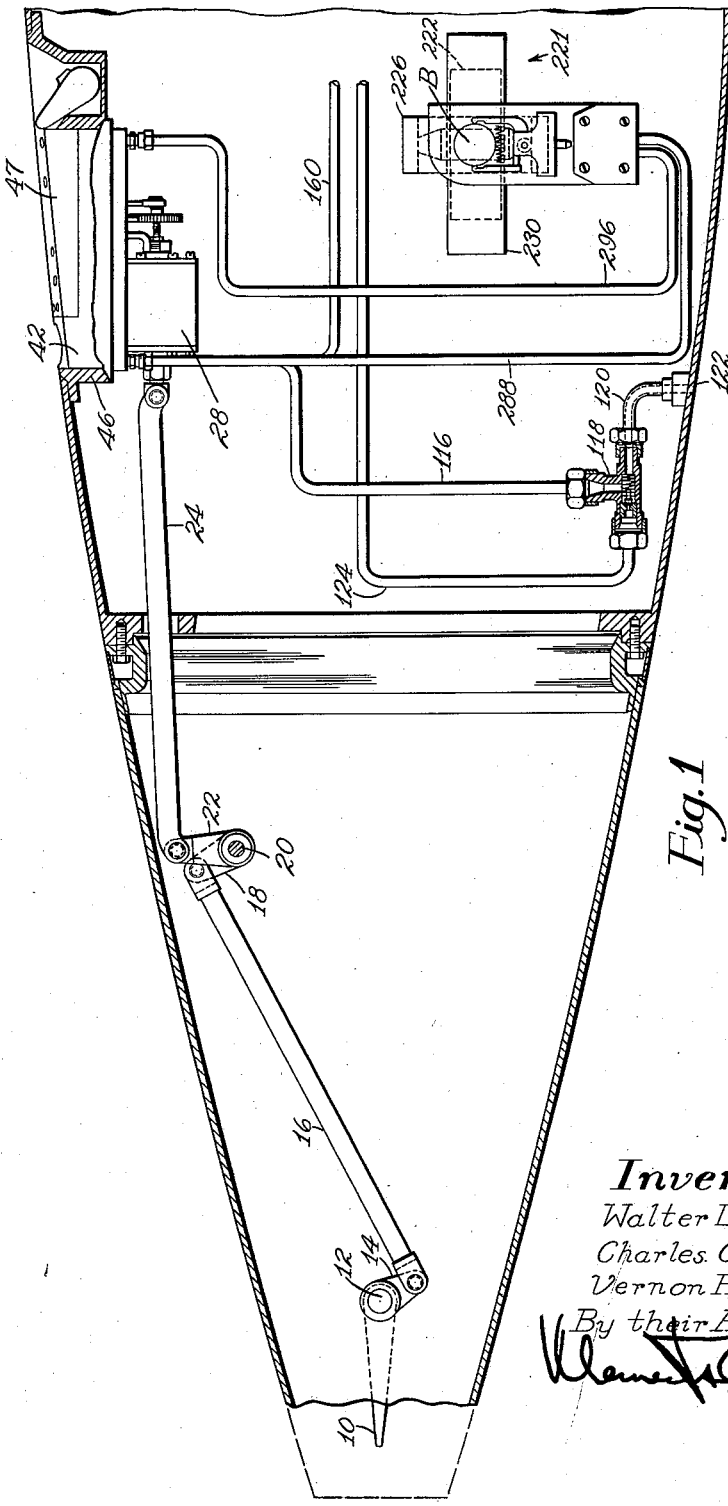

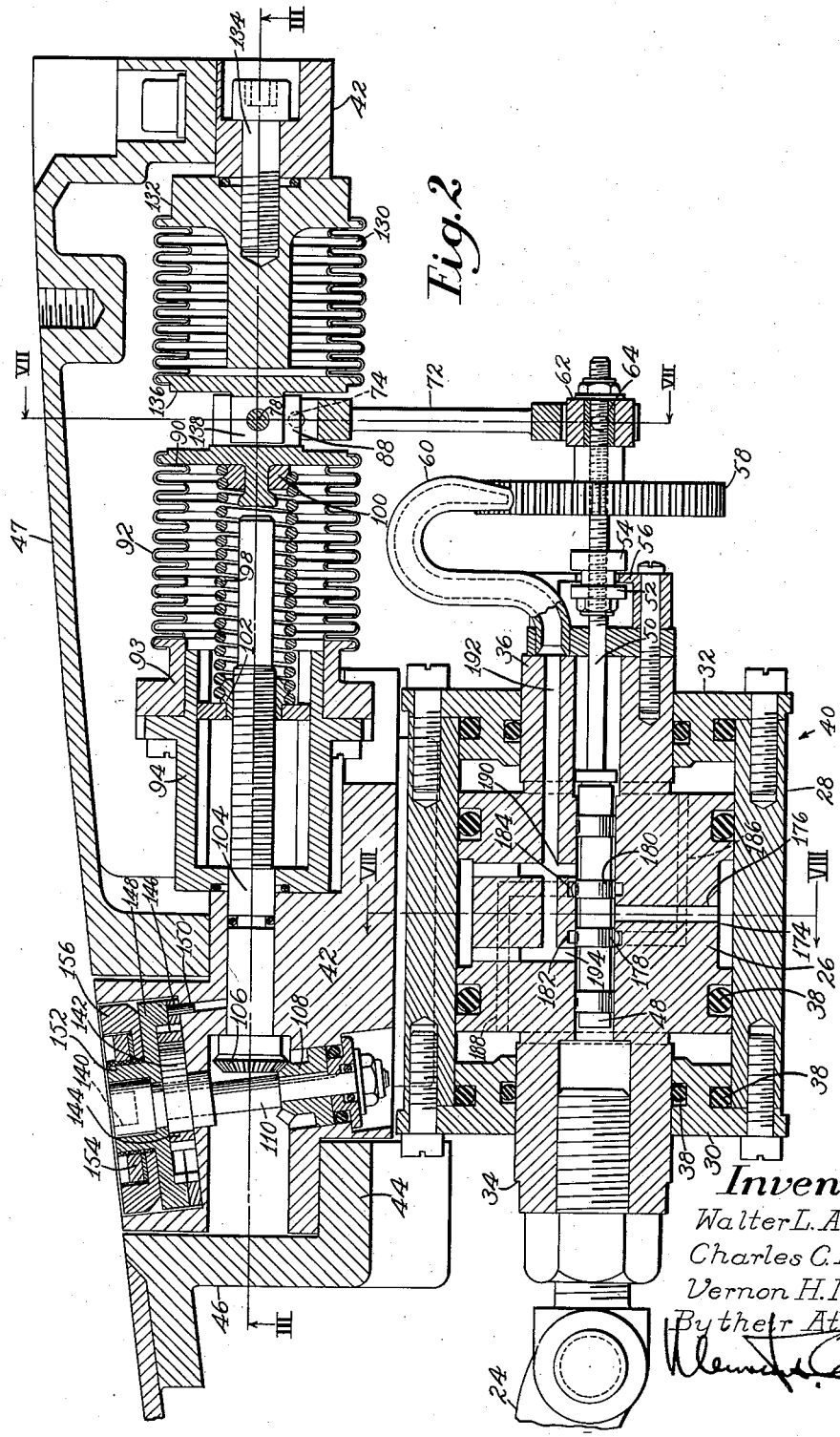

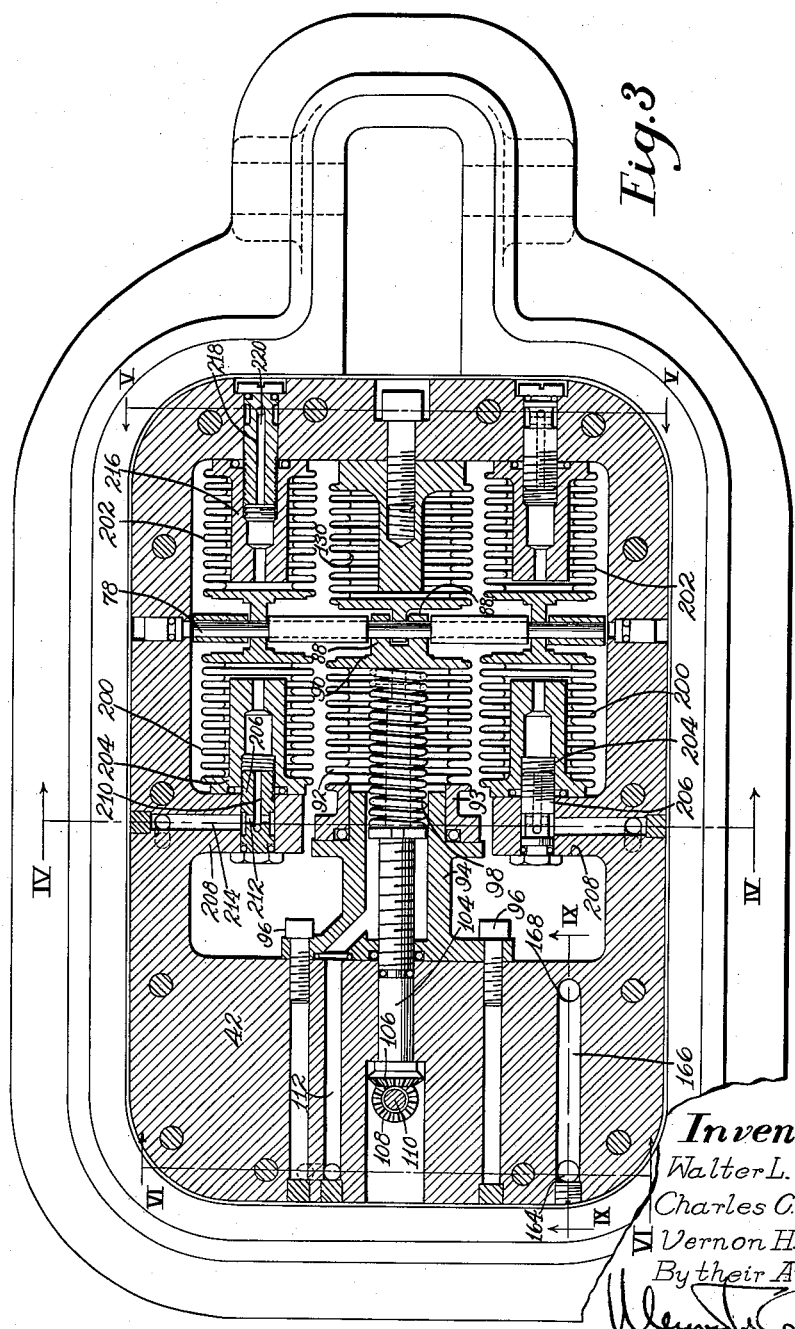

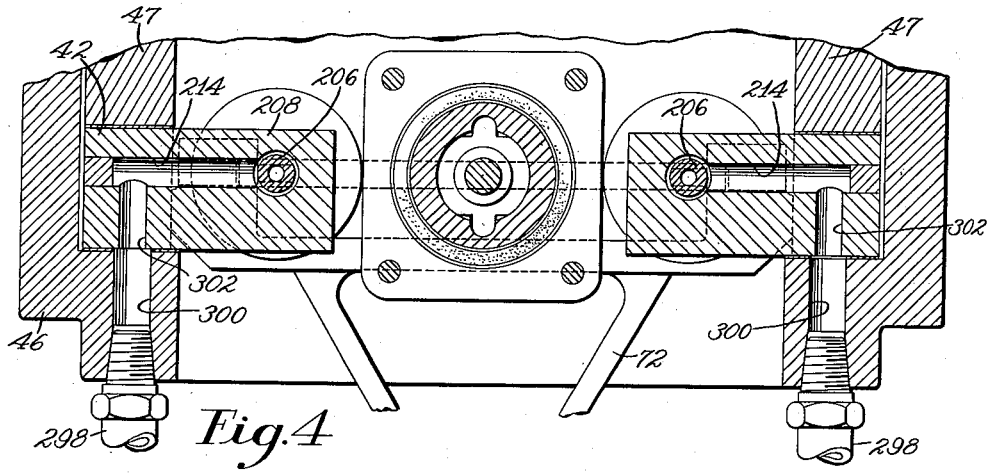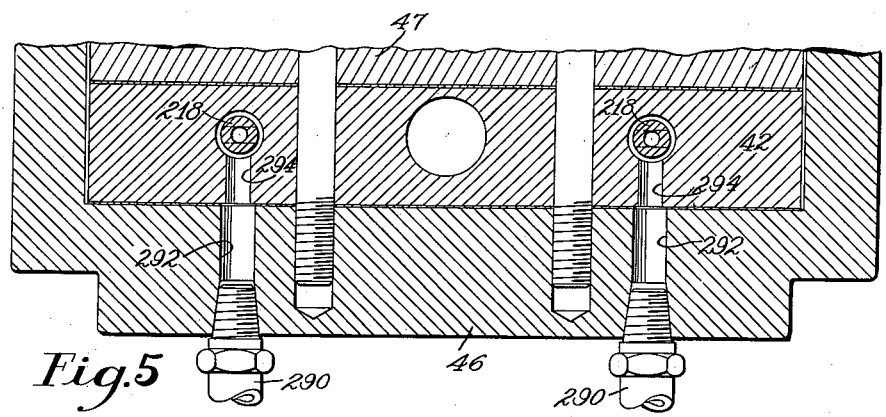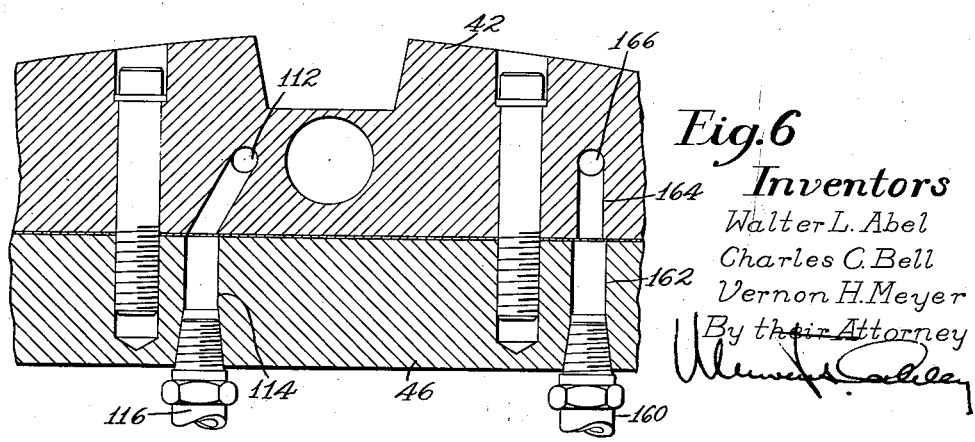

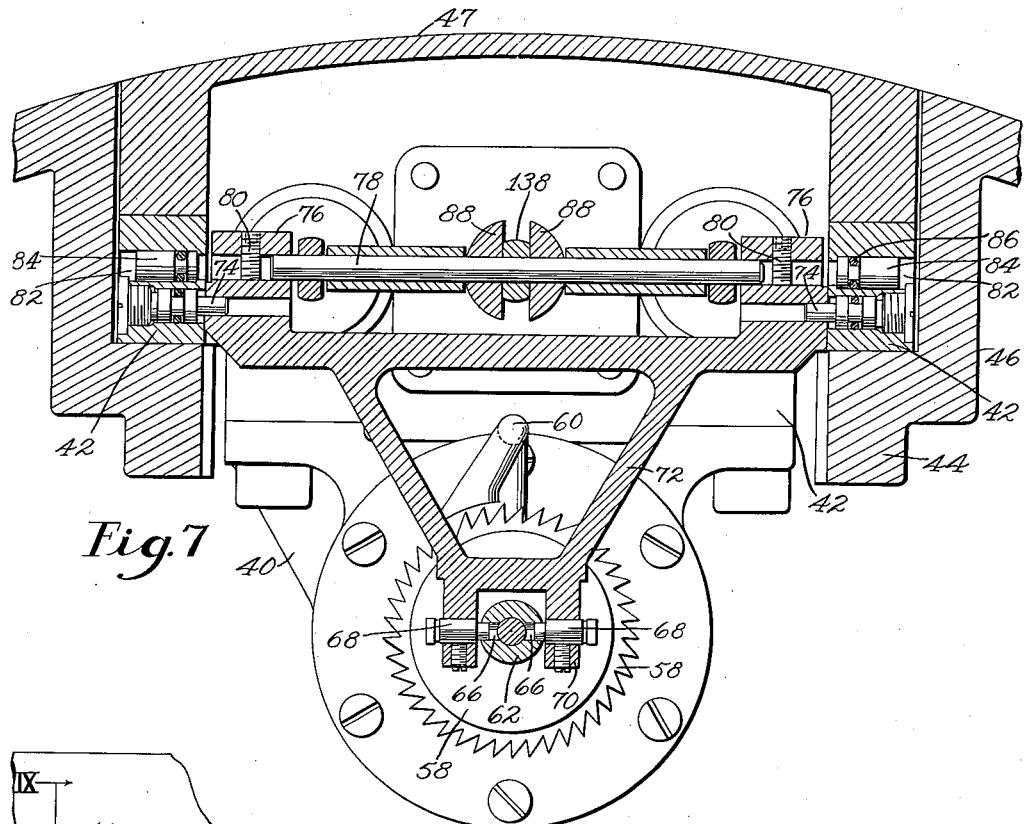
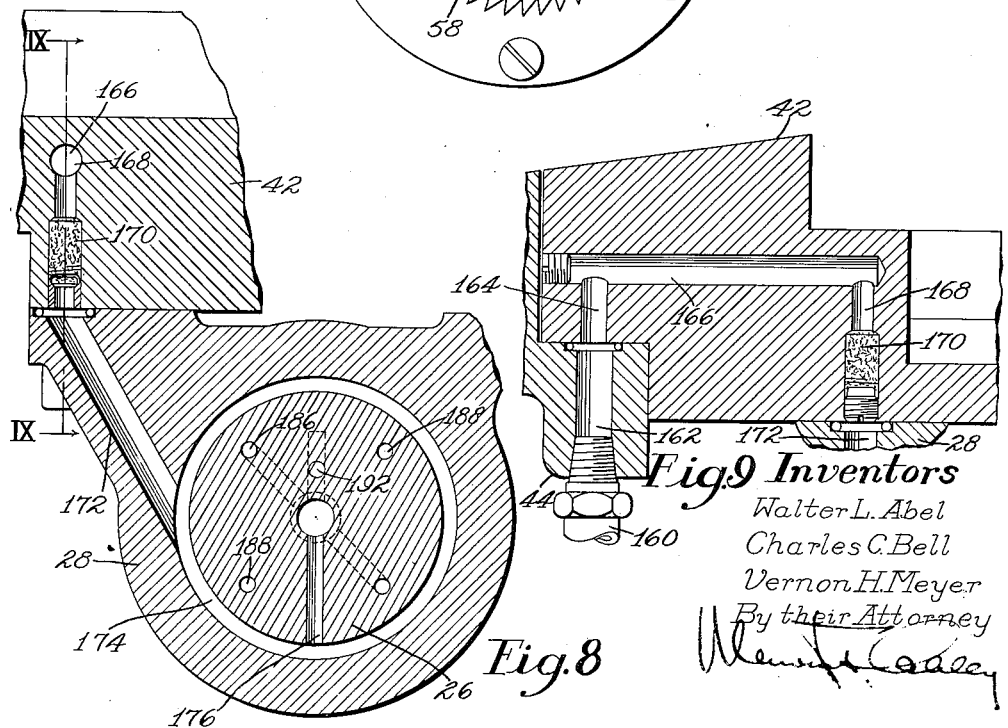
Fig. 7, Fig. 8, Fig. 9
Inventors
Walter L. Abel
Charles C. Bell
Vernon H. Meyer
By their Attorney May 2, 1961 W. L. ABEL ET AL 2,982,243
DEPTH CONTROL APPARATUS FOR TORPEDOES
Filed Feb. 11, 1946 7 Sheets-Sheet 6

May 2, 1961 W. L. ABEL ET AL 2,982,243
DEPTH CONTROL APPARATUS FOR TORPEDOES
Filed Feb. 11, 1946 7 Sheets-Sheet 7
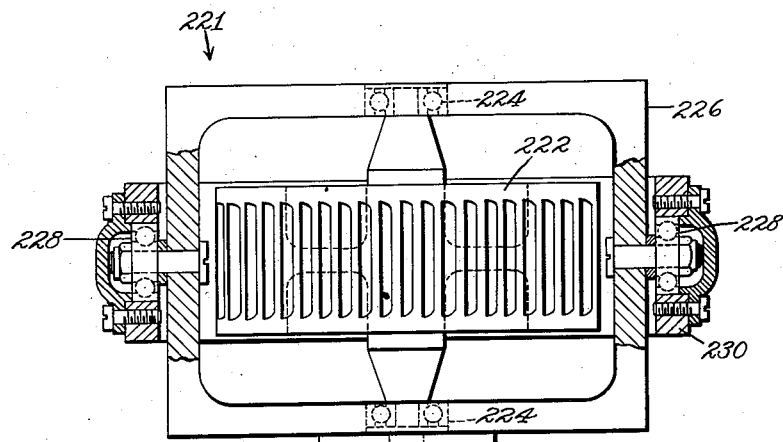
Fig.13
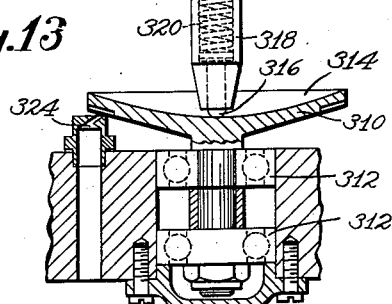
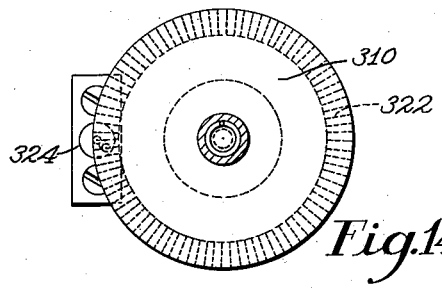
Fig.14
Inventors
Walter L. Abel
Charles C. Bell
Vernon H. Meyer
By their Attorney United States Patent Office 2,982,243
Patented May 2, 1961

2,982,243

DEPTH CONTROL APPARATUS FOR TORPEDOES

Walter L. Abel, Beverly, Mass., Charles C. Bell, Westfield, N.J., and Vernon H. Meyer, Beverly, Mass., assignors to United Shoe Machinery Corporation, Flemington, N.J., a corporation of New Jersey Filed Feb. 11, 1946, Ser. No. 646,816

6 Claims. (Cl. 114—25)

This invention relates to control apparatus, and is illustrated herein as embodied in a depth control apparatus for torpedoes although it will be understood that in some its novel and useful aspects the invention is not thus limited in its applicability.

An object of the invention is to provide an improved depth control apparatus which will enable a torpedo to reach a predetermined depth in a minimum of time and maintain that depth. To this end and in accordance with a feature of the invention the depth at which the torpedo travels is controlled by depth rudders which are in turn controlled by the conjoint action of hydrostatic pressure-responsive means and means responsive solely to the angle of tilt of the torpedo within the water.

In accordance with another feature of the invention a gyroscope provides the means which responds to the angle of tilt of the torpedo and modifies the action of the hydrostatic pressure-responsive means in a manner to minimize hunting of the torpedo in arriving at the proper depth. By using a gyroscope for this purpose changes in the velocity of the torpedo have no effect on the depth control apparatus.

The torpedo illustrated herein may be launched from an aircraft and the rotor of the depth control gyroscope is started upon launching of the torpedo. As a result of this the axis of the gyroscope takes a position in space as of the moment of release of its supporting gimbals which position is not necessarily the proper reference position. In accordance with a further feature of the invention the gyroscope is acted upon by an external force which brings it gradually to the proper reference position relatively to the torpedo without which the torpedo might proceed at a false depth. This is accomplished herein by the use of means which causes precession of the gyroscope at a slow rate whenever it is out of the proper relationship relatively to the torpedo. This slow precession does not adversely affect its control function but does provide a correction factor so that the gyroscope will be in a predetermined relationship with respect to the torpedo when the torpedo is traveling at the proper depth.

In accordance with a still further feature of the invention the precessing of the gyroscope is effected by a constantly rotating disk having a concave surface into engagement with which a pin, carried by the inner gimbal of the gyroscope, is held under light spring pressure. When this pin engages the disk at any place except the exact center thereof a frictional force is exerted on the pin in the proper direction to cause precession of the gyroscope thereby to move it toward the desired position relatively to the supporting structure.

The above and other features of the invention, including various details of construction and novel combinations of parts will now be described by reference to the accompanying drawings and pointed out in the claims.

In the drawings,

Fig. 1 is a vertical longitudinal section through the after body of a torpedo in which the present invention is embodied, illustrating diagrammatically the depth rudder control mechanism;

Fig. 2 is a vertical section on a larger scale through the rudder-operating motor and the hydrostat by which the motor is controlled;

Figure 10:
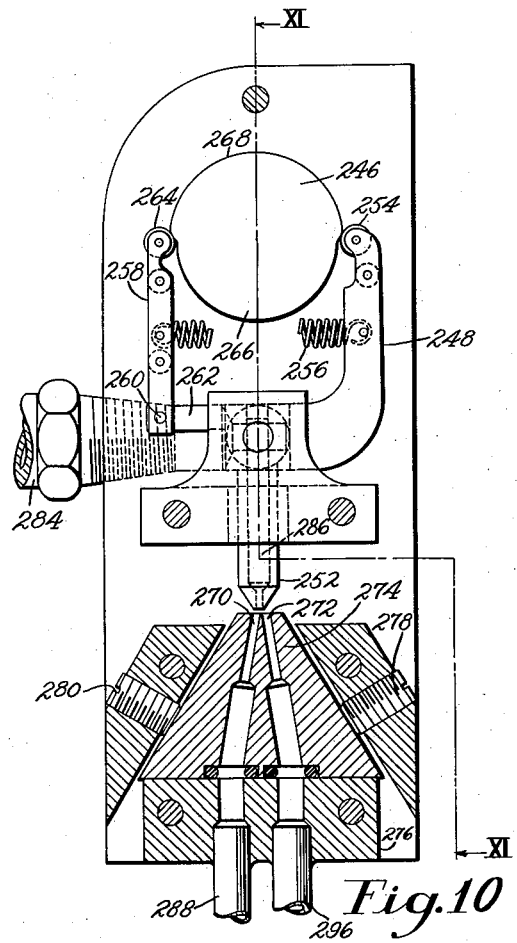
Figure 11:
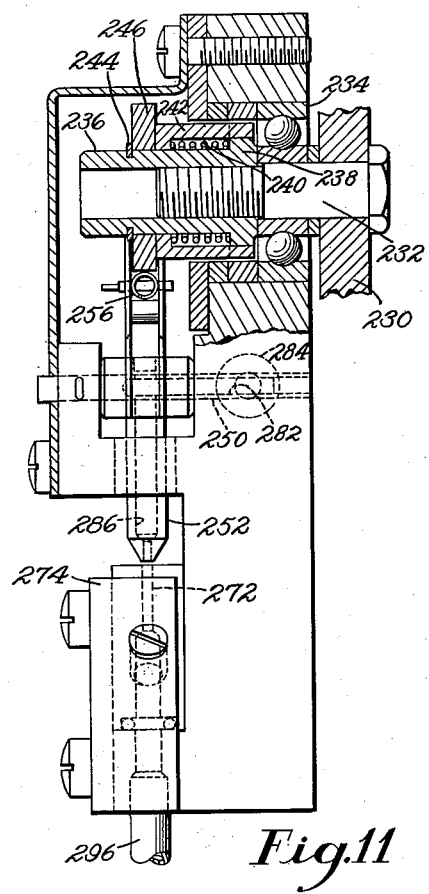
Figure 12:
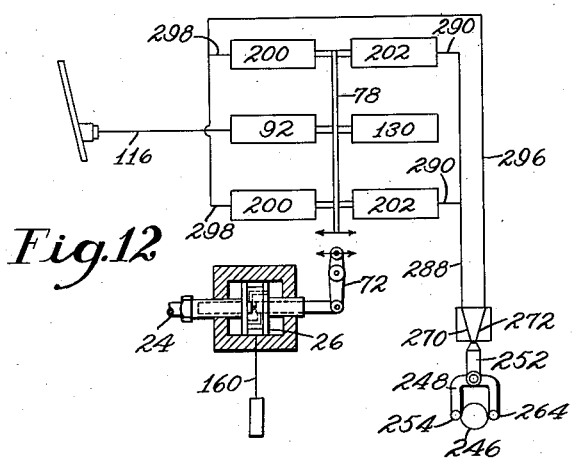

Fig. 3 is a section on the line III—III of Fig. 2;
Fig. 4 is a section on the line IV—IV of Fig. 3;
Fig. 5 is a section on the line V—V of Fig. 3;
Fig. 6 is a section on the line VI—VI of Fig. 3;
Fig. 7 is a section on the line VII—VII of Fig. 2;
Fig. 8 is a section on the line VIII—VIII of Fig. 2;
Fig. 9 is a section on the line IX—IX of Fig. 8;
Fig. 10 is an elevation partly in section of part of the control means for the rudder motor;
Fig. 11 is a section on the line XI—XI of Fig. 10;
Fig. 12 is a diagrammatic view of the control system for the rudder motor;
Fig. 13 is an elevation partly in section of the gyroscope by which the mechanism in Fig. 10 is controlled, illustrating the precessing mechanism for righting the gyroscope within the torpedo, and
Fig. 14 is a plan view of the precessing disk of Fig. 13.

The depth at which the torpedo travels in the water is controlled by a pair of rudders one on each side of the tail section of the torpedo, one of which is indicated at 10 in Fig. 1. This figure shows the tail section of a jet propelled torpedo but it should be understood that the mechanism by which the depth rudders are controlled is applicable to any type of torpedo. Each of the rudders 10 is carried by a shaft 12 to which is connected a downwardly extending arm 14 connected in turn by a link 16 to an upwardly extending arm 18 carried by a rock shaft 20. To this shaft is secured an upwardly extending arm 22 connected by a link 24 to a piston 26 (Fig. 2) mounted for horizontal movement in a cylinder 28. To the ends of this cylinder are secured caps 30, 32 having central apertures through which pass extensions 34 and 36 of the piston 26. Suitable sealing rings 38 are provided between the piston 26 and cylinder 28, between the caps 30, 32 and the cylinder and between the caps and the extensions 34, 36. The piston 26 and cylinder 28 form a motor 40 which is secured to the under side of a casting 42 supported by shoulders 44 of a support 46 carried by the wall of the torpedo. A cover plate 47 forming part of the "skin" or surface of the torpedo is secured to the casting 42. For moving the piston 26 within the cylinder 28, air under pressure is admitted into one end or the other of the cylinder under the control of an axially slidable valve 48 concentrically mounted within the piston. The manner by which this control is effected will become apparent as the description proceeds.

Extending forwardly from the valve 48 is a rod 50 carrying a pair of collars 52, 54 slightly spaced from opposite sides of a flange 56 mounted on the forward end of the extension 36 of the piston so as to permit of limited lengthwise movement of the valve stem relatively thereto. This valve stem carries a toothed wheel 58 onto the periphery of which is directed a jet of air by a tube 60 as will be explained, the purpose of which is to maintain the valve in rotation thereby to minimize the force required to move it axially within the piston and to increase the sensitivity of the control. A collar 62 is journaled on a bushing 64 secured near the outer end of the stem 50. This collar 62, as shown in Fig. 7, is provided with diametrically opposed apertures 66 which receive pins 68 carried by downwardly extending arms 70 of a yoke 72 pivoted on pins 74 carried by the casting 42. Carried by arms 76 extending upwardly from the pivot pins 74 is a shaft 78 which is confined against excessive longitudinal movement within the arms 76 by stop screws 80 carried by the arms. Apertures 82 in the casting 42 are provided to facilitate insertion of the shaft 78 after the yoke has been mounted in the casting 42 and these holes are sealed by plugs 84 carrying sealing rings 86 to exclude the entrance of water.

Connected to a mid portion of the shaft 78 is a pair of arms 88 of a cap 90 (Figs. 2 and 3) supporting one end of a bellows 92 the other end of which is secured to a collar 93 carried by a flanged tube 94 which is in turn supported by screws 96 from the casting 42. The interior of the bellows 92 is subject to a pressure which corresponds to the hydrostatic pressure of the water at the depth in which the torpedo is traveling and this pressure acts in opposition to a tension spring 98 threaded at one end on a nut 100 carried by a rearward extension of the cap 90, the other end of the spring being secured to a nut 102 threaded on the forward end of a shaft 104 carrying at its rearward end a beveled gear 106 meshing with a similar gear 108 on the lower end of a shaft 110. Upon turning the shaft 110 the shaft 104 is rotated to vary the position of the nut 102 carrying the rearward end of the spring 98 thereby to vary the force exerted by the spring which is opposed by the hydrostatic pressure of the water. Actually the bellows 92 is maintained full of air inasmuch as admission of salt water into its interior would cause damage thereto and because of the fact that torpedoes are usually given a series of tests before being put into actual use it is necessary to avoid such damage. The interior of the bellows 92 communicates through the tube 94 (Fig. 3) with a passageway 112 in the casting 42 and a passageway 114 (Fig. 6) in the support 46, this latter passageway being connected by a pipe 116, a valve housing 118 (Fig. 1) and a pipe 120 to a water inlet 122 in the torpedo. The valve housing 118 is connected by a pipe 124 to a source of air under low pressure so that air is constantly being admitted into the pipes 116 and 120 thereby to maintain a column of water and air in these pipes but the air will be under the same pressure as that of the water and consequently the space within the bellows will be maintained full of air which is likewise under the same hydrostatic pressure. Consequently the yoke 72 (Figs. 2 and 7) which is connected by the shaft 78 to the bellows will be rocked about the pivots 74 in response to variations in the hydrostatic pressure of the ambient water and these rocking movements are imparted to the valve 48 which cause corresponding movements of the piston 26.

Variations in temperature within the torpedo will cause changes in pressure around the bellows 92. In order that these pressure changes will not affect the accuracy of the depth control mechanism a reference bellows 130, having the same diameter as the bellows 92, is connected at one end to a support 132 secured by a screw 134 to the casting 42, the other end of the bellows being secured to a plate 136 having a rearwardly extending arm 138 through which the shaft 78 passes. Accordingly, changes in pressure of the air exteriorly of the bellows 92 will act also on the bellows 130 and consequently will have no effect on the movement of the yoke 72. Were the bellows 130 filled with a gas, temperature changes would vary the pressure of the gas and accordingly would introduce errors in the depth control. Accordingly, the bellows 130 is exhausted and is under a partial vacuum so that temperature changes will introduce no measurable error in the depth control mechanism.

To facilitate adjustment of the spring 98 by which the depth of travel of the torpedo is controlled, the upper end of the shaft 110 is provided with a socket 140 to receive a tool by which the shaft may be turned. Secured to the shaft is an eccentric 142 journaled on which is a planetary gear 144 arranged for engagement with a pair of ring gears 146, 148. The ring gear 146 is held by a pin 150 against rotation in the bottom of a chamber formed in the casting 42 and has a smaller number of teeth than the gear 148 which is permitted to turn with respect to the gear 146. For example the gear 146 may have forty teeth and the gear 148 may have forty-one teeth. Thus it will be seen that the latter gear will rotate very slowly during rotation of the shaft 110 and the consequent travel of the planetary gear 144 about the axis thereof. The gear 148 has a portion overlying the eccentric 142 and an exteriorly threaded hub portion 152 for receiving a nut 154. This nut is provided for clamping a flanged ring 156 against the upper surface of the gear 148 for rotation therewith. This ring may be provided with suitable indicia, not shown, for cooperation with an index mark on the adjacent surface of the casting 42, and by loosening the nut 154 the ring 156 may be properly positioned during calibrating of the mechanism. There is thus provided an effective means for indicating the depth at which the torpedo is to travel.

Air under pressure for operating the motor 40 is supplied through a line 160 (Fig. 1) which communicates with a bore 162 (Fig. 9) in the frame member 44 and with bores 164, 166, 168 in the casting 42. A suitable filter 170 is provided in the outlet end of the bore 168 to prevent foreign matter from entering the motor 40 and the bore 168 communicates with a bore 172 in the wall of the cylinder 28 which directs the air under pressure into an annular chamber 174 (Fig. 2) between the piston 26 and the cylinder 28 formed by an annular groove in the periphery of the piston. This groove communicates by a passageway 176 with the valve chamber between a pair of elements 178, 180 which control the flow of air from the valve chamber through ports 182, 184 which direct the air into the right and left ends of the cylinder 28 respectively. With the valve member 48 in its normal position as shown in Fig. 2, both ports 182 and 184 are closed by the valve elements 178 and 180.

Assuming that the torpedo is traveling below its desired depth the pressure within the bellows 92 which is dependent upon the hydrostatic pressure of the water at the depth at which the torpedo is traveling overcomes the action of the spring 98 causing the yoke 72 to move in a clockwise direction moving the valve member 48 to the left, uncovering the port 182 to the supply of air under pressure. The air now flows through bores 186 in the piston 26 into the right end of the cylinder 28 moving the piston to the left and through the connection shown in Fig. 1 causing the rearward end of the rudder 10 to be moved upwardly, thereby causing the torpedo to rise. The air in the left end of the cylinder 28 passes through bores 188 and ports 184 into a port 190 which connects with a passageway 192 through which the air is conducted into the tube 60 and directed onto the periphery of the wheel 58. It will be understood that upon movement of the valve 48 in the opposite direction in response to travel of the torpedo above its desired depth, air will flow through passages 188 into the left end of the cylinder and exhaust through passages 186, ports 182 and a port 194 into the passageway 192. After the piston 26 has been moved an amount equal to the movement of the valve 48 the ports 182 and 184 are again shut off thus locking the piston 26 against further movement. Thus it will be seen that the amount of movement of the depth rudders depends on the extent of movement of the valve 48 which movement is dependent not only upon hydrostatic pressure but upon other factors as will be explained below, in order to obtain maximum accuracy of control.

Were the depth rudders of the torpedo controlled solely by hydrostatic pressure, as described above, the torpedo would continually overshoot the proper depth or hunt and never become stabilized at the proper depth. Consequently provision is made for modifying the action of the hydrostatic control mechanism on the valve 26 so as to prevent excessive hunting of the torpedo. As shown in Fig. 3, two sets of bellows 200, 202 are connected to the shaft 78, the bellows of each set being positioned at opposite sides of the hydrostatically-controlled bellows 92, the bellows 200 being disposed on the same side of the shaft as the bellows 92 and the bellows 202 being disposed at the other side of the shaft opposite to the bellows 200. The bellows 200 are carried by supports 204 secured by screws 206 to inwardly extending arms 208 of the casting 42. These screws are provided with passageways 210 which are open to the interior of the bellows and with ports 212 which provide communication between these passages and bores 214 in the arms 208 through which air under pressure passes to the bellows. Similarly the bellows 202 are carried by supports 216 carried by screws 218 supported in the casting 42 and having passageways 220 providing communication between the bellows 202 and another source of air under pressure as will be explained. Air is admitted into one of the two sets of bellows depending upon whether the torpedo is diving or rising, thereby modifying the action of the bellows 92 on the shaft 78 in accordance with the angle of the torpedo in the water so that when the torpedo approaches its predetermined depth it will be leveling out and hunting is thereby minimized.

For controlling the flow of air under pressure into the bellows 200, 202, gyroscopically-controlled mechanism is employed. Such a mechanism measures the angular position of the torpedo in the water but is not responsive to changes of velocity of the torpedo. This mechanism embodies a gyroscope 221 (Figs. 1 and 13) which includes a rotor 222 journaled at 224 in an inner gimbal 226 which is in turn journaled at 228 in an outer gimbal 230. This outer gimbal is journaled in the torpedo on stub shafts extending from opposite sides thereof one of which is illustrated at 232 in Fig. 11. This shaft is journaled in ball bearings 234 and has an outer threaded portion which receives a sleeve 236 having a flange 238 at its inner end forming an abutment for one end of a spring 240, the other end of which engages a flange of a sleeve 242. Interposed between the sleeve 242 and a locking collar 244 is a cam 246 frictionally held against rotation between the collar and the sleeve 242. However, this cam may be turned relatively to the sleeve 236 upon application of sufficient force when the original adjustments of the mechanism are made.

The cam 246 controls the position of an arm 248 pivoted on a pin 250 and terminating in a downwardly extending nozzle 252. The upper end of the arm 248 carries a roll 254 which is maintained in engagement with the periphery of the cam by a tension spring 256 secured at one end to the arm 248 and at its other end to an arm 258 pivoted at 260 on a bracket 262 and carrying at its upper end a roll 264, which engages the cam diametrically opposite the roll 254.

As shown in Fig. 10, the cam 246 has portions 266 and 268 of relatively small and large diameters. When the torpedo is level in the water the roll 254 is midway between these two portions, as illustrated, so that the nozzle 252 is in a position midway of a pair of apertures 270, 272 in a block 274 held in the proper position on a support 276 by a pair of adjusting screws 278, 280. The pin 250 on which the arm 248 with its nozzle 252 is pivoted has an air passageway 282 extending partially therethrough, as shown in Fig. 11, providing communication between a pipe 284 and a passageway 286 extending through the nozzle 252.

The aperture 270 is connected to a pipe 288 having a branched upper end providing pipes 290 (Figs. 5 and 12) communicating with passageways 292 in the support 46 which in turn communicate with bores 294 through which the air pressure is directed by way of the screws 218 (Fig. 3) into the interior of the bellows 202. Similarly the aperture 272 (Fig. 10) is connected by a pipe 296 having a pair of branches 298 at its upper end through which air under pressure is directed into bores 300 in the support 46 and 302 in the casting 42 into the passageways 214 and the bellows 200.

With the torpedo traveling on a level course at the proper depth, the pressure of the air passing through the pipe 284 and emitting from the nozzle 252 will be divided evenly between the apertures 270 and 272 so that the pressure of the air in the bellows 200 and 202 will be equal and these bellows will have no effect whatever on the position of the valve 48 (Fig. 2). Assume, however, that the torpedo has not reached the predetermined depth whereupon the valve 48 has been moved to the right under the influence of the hydrostatically controlled bellows 92, thereby causing a similar movement of the piston 26 which moves the rudder in a counterclockwise direction as viewed in Fig. 1. At this time the inclination of the torpedo is such that the cam roll 254 has moved onto the low part 266 of the cam 246. This causes the nozzle 252 to move to the right as viewed in Fig. 10 whereupon more air is directed into the aperture 272 than the aperture 270 and the pressure in the bellows 200 (Fig. 3) becomes higher than that in the bellows 202. This exerts a force on the shaft 78 tending to move the yoke 72 in a clockwise direction which tends to move the valve 48 to the left. The result of this is that the valve 48 is not moved as far to the right under the influence of the hydrostatic pressure as it would otherwise be if this were the only controlling force. As the torpedo descends to the proper depth the hydrostatic pressure increases thereby causing movement of the valve 48 toward the left and the rudders 10 are gradually moved upwardly. The result is that as the torpedo approaches a level condition the cam roll 254 starts to climb onto the high parts 268 of the cam moving the nozzle 252 back to its mid position which causes a drop of pressure in the bellows 200 and an increase of the pressure in the bellows 202 and consequently the rudder is moved upwardly somewhat faster at this time than it would be were it controlled solely by the hydrostatic pressure. Thus the gyroscope acts to anticipate the proper position of the rudders when the torpedo is at the proper depth and over-shooting or hunting of the torpedo is greatly minimized.

The gyroscope is started upon launching of the torpedo by air under pressure supplied to the periphery of the rotor 222 (Fig. 13) during which time the gimbals of the gyroscope are locked in predetermined positions with respect to the torpedo by means such as that illustrated and described in application for Letters Patent of the United States, Serial No. 625,534, filed on October 30, 1945, in the names of Vernon H. Meyer and James V. Cantley, now Patent No. 2,415,899, granted February 18, 1947. Release of the locking means may take place before the torpedo is in the water and the position of the gyroscope in space may not be the proper reference, thereby causing the torpedo to proceed at a false depth. Consequently provision is made for causing a slow precession of the gyroscope causing it to move relatively to the body of the torpedo when it is not in the proper relationship thereto. For this purpose a constantly rotating precessing disk 310 (Figs. 13 and 14) is journaled in bearings 312 and has a concave face 314 into engagement with which is used a pin 316 slidable in a sleeve 318 carried by the inner gimbal of the gyroscope in line with the axis about which the rotor turns. A light coil spring 320 maintains the pin in engagement with the concave surface of the disk which is provided on its opposite face with a series of teeth or vanes 322 which receive a blast of air from a nozzle 324 whereby this disk is kept continually rotating during travel of the torpedo. The direction of rotation of the disk is such that should the gyroscope be out of its predetermined relation with respect to the body of the torpedo a force is exerted on the inner gimbal through the frictional drag between the disk 310 and the pin 316 so as to cause the gyroscope to process slowly into the proper position. This rate of precession is sufficiently slow so that once the torpedo has been in the water and is traveling at or approximately at its proper depth the precession has no appreciable effect upon the accuracy of control. Its main purpose is to bring it into the desired position in space after the torpedo enters the water and this is accomplished by causing a slow precession thereof toward a predetermined position relatively to the torpedo and consequently it is assured that the gyroscope will exert the proper influence on the depth rudders regardless of its position at the beginning of the run.

From the above it will be seen that we have provided a simple but effective depth control for a torpedo by which hunting thereof is minimized without the use of complicated mechanisms which have been heretofore employed and which require a great deal of time and effort accurately to calibrate.

Having thus described our invention what we claim as new and desire to secure by Letters Patent of the United States is:

1. In a torpedo, a depth rudder, a fluid-pressure motor operatively connected thereto for controlling its position, a valve associated with said motor and arranged to supply pressure fluid thereto to move the motor in accordance with the movement of said valve, means responsive to the hydrostatic pressure of the ambient water for controlling the position of said valve, means operative in response to the angle of tilt of the torpedo in the water for superimposing a correction factor on said last named means, said last named means comprising a gyroscope mounted within the torpedo, pressure-responsive means acting on said valve controlled by relative movements of the torpedo and the gyroscope, and means acting on said gyroscope for causing a gradual precession thereof into a predetermined position relatively to the torpedo whenever it is not in such position.

2. In a torpedo, a depth rudder, a motor for positioning said rudder, a control member for said motor operable upon its movement into different positions to cause the depth rudder to be moved into corresponding positions, a reference bellows connected to said member and being under a high degree of vacuum whereby it is substantially unaffected by temperature changes, a power bellows connected to said member in opposition to said reference bellows and subject to the hydrostatic pressure of the ambient water, a spring acting on said member in opposition to said power bellows, and means for adjusting said spring.

3. In a torpedo, a depth rudder, a motor for positioning said rudder, a control member for said motor operable upon movement of the member into different positions to cause the depth rudder to be moved into corresponding positions, a reference bellows connected to said member and being under a high degree of vacuum whereby it is substantially unaffected by temperature changes, a power bellows connected to said member in opposition to said reference bellows and subject to the hydrostatic pressure of the ambient water, a pair of opposed bellows acting on said member, and means responsive to tilting of the torpedo in the water for varying the relative pressures in said last-named bellows thereby to minimize hunting of the torpedo in arriving at the predetermined depth.

4. In a torpedo, a depth rudder, a motor for positioning said rudder, a control member for said motor operable upon movement of the member into different positions to cause the depth rudder to be moved into corresponding positions, a reference bellows connected to said member and being under a high degree of vacuum whereby it is substantially unaffected by temperature changes, a power bellows connected to said member in opposition to said reference bellows and subject to the hydrostatic pressure of the ambient water, a pair of opposed bellows acting on said member, means responsive to tilting of the torpedo in the water for varying the relative pressures in said last-named bellows thereby to minimize hunting of the torpedo in arriving at the predetermined depth, a spring acting on said member in opposition to said power bellows, and means for adjusting said spring to vary the depth at which the torpedo is to travel.

5. In a torpedo, a depth rudder, hydrostatic means controlling the position of said rudder to cause travel of the torpedo at a predetermined depth, a gyroscope having its outer gimbal rotatable about a horizontal axis, means operated by said gyroscope for applying a correction factor to said hydrostatic means to minimize hunting of the torpedo in arriving at said depth, and means acting on said gyroscope for causing a gradual precession thereof whenever it is not in a predetermined position relatively to said torpedo to move it toward said position.

6. In a torpedo, a depth rudder, hydrostatic means controlling the position of said rudder to cause movement of the torpedo at a predetermined depth, a gyroscope having its outer gimbal rotatable about a horizontal axis, means operated by said gyroscope for applying a correction factor to said hydrostatic means to minimize hunting of the torpedo in arriving at said depth, and means acting on said gyroscope for causing a gradual precession thereof whenever it is not in a predetermined position relatively to said torpedo to move it toward said position, said last-named means comprising a constantly rotating disk, a pin carried by the inner gimbal of the gyroscope, and a spring holding said pin against the surface of said disk under light pressure.

References Cited in the file of this patent

UNITED STATES PATENTS

| | | |
|---|---|---|
| 1,022,706 | Shonnard | Apr. 9, 1912 |
| 1,659,653 | Hammond et al. | Feb. 21, 1928 |
| 1,825,345 | Fieux | Sept. 29, 1931 |
| 2,104,627 | Von Manteuffel | Jan. 4, 1938 |

FOREIGN PATENTS

| | | |
|---|---|---|
| 660,464 | Germany | May 25, 1938 |